US010838989B2

(12) United States Patent
Mazniker et al.

(10) Patent No.: US 10,838,989 B2
(45) Date of Patent: *Nov. 17, 2020

(54) GENERATING TEXTUAL SUMMARY ABOUT PHYSICAL LOCATION BASED ON COMPUTING INTERACTIONS PERTAINING TO PHYSICAL LOCATION

(71) Applicant: Google LLC, Mountain View, CA (US)

(72) Inventors: Boris Mazniker, San Francisco, CA (US); Mayur Datar, Maharashtra (IN)

(73) Assignee: GOOGLE LLC, Mountain View, CA (US)

(*) Notice: Subject to any disclaimer, the term of this patent is extended or adjusted under 35 U.S.C. 154(b) by 103 days.

This patent is subject to a terminal disclaimer.

(21) Appl. No.: 16/117,152

(22) Filed: Aug. 30, 2018

(65) Prior Publication Data

US 2018/0373735 A1 Dec. 27, 2018

Related U.S. Application Data

(63) Continuation of application No. 14/504,018, filed on Oct. 1, 2014, now Pat. No. 10,089,326.

(Continued)

(51) Int. Cl.
*G06F 16/29* (2019.01)
*G01C 21/36* (2006.01)
(Continued)

(52) U.S. Cl.
CPC ......... *G06F 16/29* (2019.01); *G01C 21/3679* (2013.01); *G06F 16/9537* (2019.01); *G06Q 30/0201* (2013.01)

(58) Field of Classification Search
None
See application file for complete search history.

(56) References Cited

U.S. PATENT DOCUMENTS 8,326,831 B1  12/2012  Aguera y Arcas et al.
8,838,586 B2  9/2014  Waldman et al.
(Continued)

FOREIGN PATENT DOCUMENTS

| CN | 102591911 A | 7/2012 |
|---|---|---|
| CN | 102594905 A | 7/2012 |
| CN | 102611785 A | 7/2012 |

OTHER PUBLICATIONS

China National Intellectual Property Administration; Office Action issued for Application No. 20150035895.5 dated Feb. 26, 2019.

(Continued)

*Primary Examiner* — Thu N Nguyen
(74) *Attorney, Agent, or Firm* — Middleton Reutlinger

(57) ABSTRACT

Methods and apparatus for determining aspects of locations based on computing interactions of users that pertain to the locations. In some implementations, an aspect of a location may be determined based on comparing a first computing interaction measure for the location to a second measure. The first computing interaction measure may be determined based on a first group of computing interactions that pertain to the location. In some implementations, the second measure may be determined based on a second group of addition computing interactions. In some implementations, a textual summary may be generated automatically based on the first and/or second computing interaction measure, and/or based on the determined aspect.

20 Claims, 5 Drawing Sheets

Related U.S. Application Data

(60) Provisional application No. 62/025,341, filed on Jul. 16, 2014.

(51) Int. Cl.
*G06F 16/9537* (2019.01)
*G06Q 30/02* (2012.01)

(56) References Cited

U.S. PATENT DOCUMENTS

| | | |
|---|---|---|
| 8,855,681 B1 | 10/2014 | George et al. |
| 2006/0123014 A1 | 6/2006 | Ng |
| 2010/0191797 A1 | 7/2010 | Seefeld et al. |
| 2011/0218992 A1 | 9/2011 | Waldman et al. |
| 2012/0143859 A1 | 6/2012 | Lymperopoulos et al. |
| 2012/0304087 A1 | 11/2012 | Walkin et al. |
| 2013/0111512 A1 | 5/2013 | Scellato et al. |
| 2013/0297206 A1 | 11/2013 | Heng et al. |
| 2014/0040236 A1 | 2/2014 | Vijaywargi et al. |
| 2015/0100383 A1 | 4/2015 | Chauhan |

OTHER PUBLICATIONS

China National Intellectual Property Administration; Office Action issued in Application No. 201580035895.5 dated Aug. 14, 2019.
International Search Report and Written Opinion of PCT Serial No. PCT/US15/040609 dated Oct. 23, 2015.
China National Intellectual Property Administration; Office Action issued for Application No. 20150035895.5 dated Jun. 3, 2020.

GENERATING TEXTUAL SUMMARY ABOUT PHYSICAL LOCATION BASED ON COMPUTING INTERACTIONS PERTAINING TO PHYSICAL LOCATION

BACKGROUND

Aspects of physical locations, such as businesses, may be determined from Internet documents that are related to the physical locations and/or explicit input of individuals that are related to the physical locations. For example, a webpage related to a business may be analyzed to identify a category of the business, a location of the business, etc. As another example, reviews submitted by users related to a business may be analyzed to determine an overall rating of the business. As yet another example, an owner of the business or another user may manually input information to a service that maintains business information to have the business information reflected by the service. For instance, an owner may enter the address, operating hours, webpage, and other information related to the business.

SUMMARY

This specification is directed generally to methods and apparatus for generating textual summaries about physical locations, such as businesses, based on aggregating and analyzing computing interactions by users that pertain to the physical locations. In some implementations, computing interactions by users that pertain to physical locations that may be utilized to determine aspects of the physical locations include, for example, directional queries seeking directions to the locations (e.g., driving, walking, and/or public transportation directions), searches related to the locations (e.g., map-based searches and/or searches for Internet documents), location data from mobile devices (e.g., based on GPS, Wi-Fi, and/or other sensors), calendar entries related to the locations, photos or other media items of the user having metadata related to the locations (e.g., geotags of the media items), check-ins to the locations, reviews of the locations, and/or starring or otherwise flagging the locations on a map and/or other interfaces. A generated textual summary may be presented to a user in various ways.

In some implementations, a first computing interaction measure for a physical location may be determined based on a first group of computing interactions associated with the location. For example, a first computing interaction measure may be determined for a location that is indicative of a quantity of computing interactions and/or duration of computing interactions with the location as indicated by the computing interactions of the first group. The computing interaction measure may be compared to a second computing interaction measure to determine an aspect of the location and/or generate a textual summary about the location.

In some implementations, the second computing interaction measure may include one or more static or dynamic thresholds. For example, the first computing interaction measure may be indicative of duration of interactions with the location and the second measure may be a static threshold duration. If the first computing interaction measure fails to satisfy the threshold duration, the aspect may be indicative of a "quick-stop" business (e.g., a quick-bites restaurant) and if it satisfies the threshold duration, the aspect may be indicative of a "long-stop" business (e.g., a long sit-down restaurant).

In some implementations, the second computing interaction measure may additionally or alternatively include an additional computing interaction measure that is based on a second group of computing interactions that are in addition to the first group of computing interaction interactions utilized to determine the first computing interaction measure. For example, the second group may include computing interactions associated with the physical location that are temporally distinct from the computing interactions of the first group. For instance, the first computing interaction measure may be indicative of a quantity of interactions with the location during one or more first time periods and the second measure may be indicative of a quantity of interactions with the location during one or more second time periods. Also, for example, the second group may include computing interactions associated with one or more additional physical locations that are in addition to the location. For instance, the first computing interaction measure may be indicative of a quantity of interactions with the location and the second measure may be indicative of a quantity of interactions with one or more locations that are similar to the location (e.g., a "peer group" of physical locations). Additional description of example aspects that may be determined and example techniques for determining such aspects are provided herein.

One or more determined aspects assigned to a physical location may be utilized for various online services. For example, the determined aspects of a business may be included in a textual summary for display in combination with other information related to the business. Also, for example, the determined aspects of a business may be utilized to identify and provide the business' identity to a user in response to a user selection indicative of the aspect. For instance, a user selection of "trending restaurants near me" may be utilized to identify restaurants near the user that are associated with an aspect of "trending up". Also, for example, the determined aspects of a business may be utilized to rank information related to the business that is identified as responsive to a query or other information request of a user. For instance, the information related to the business may be promoted if the business is associated with a determined aspect of "trending up". Also, for instance, the query may include one or more terms such as "popular with locals", the business may be associated with a related aspect indicating popularity with locals, and the ranking of the information related to the business may be promoted in search results provided responsive to the query.

In some implementations, a method is provided that includes the steps of: identifying, from one or more databases, a first group of computing interactions that pertain to a physical location; identifying, from the one or more databases, a second group of computing interactions that pertain to one or more additional physical locations, wherein the one or more additional physical locations satisfy one or more criteria; determining a first computing interaction measure for the physical location based on the first group of computing interactions; determining a second computing interaction measure for the one or more additional physical locations based on the second group of computing interactions; and automatically generating a textual description of the physical location based on comparison of the first computing interaction measure to the second computing interaction measure.

This method and other implementations of technology disclosed herein may each optionally include one or more of the following features. In some implementations, the one or more criteria may include being located within a geographic area associated with the physical location. In some implementations, the method may further include selecting the geographic area based at least in part on a population or size of the geographic area. In some implementations, the one or more criteria may include being associated with a particular price range.

In some implementations, the method may further include defining the particular price range based on a price range associated with the physical location or a user preference. In some implementations, the one or more criteria may include being associated with a particular category. In some implementations, the one or more criteria may include being located within a geographic area associated with the physical location. In some implementations, automatically generating the textual description of the physical location comprises including, in the textual description, an indication of a how the first computing interaction measure compares to the second computing interaction measure.

In some implementations, the method further includes determining the one or more criteria based on contextual data associated with a user computing device. In some implementations, the contextual data may include a user search, performed on the user computing device, relating to physical locations that satisfy the one or more criteria. In some implementations, the contextual data may include a location of the user computing device. In some implementations, the contextual data may include a directional query performed on the user computing device.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
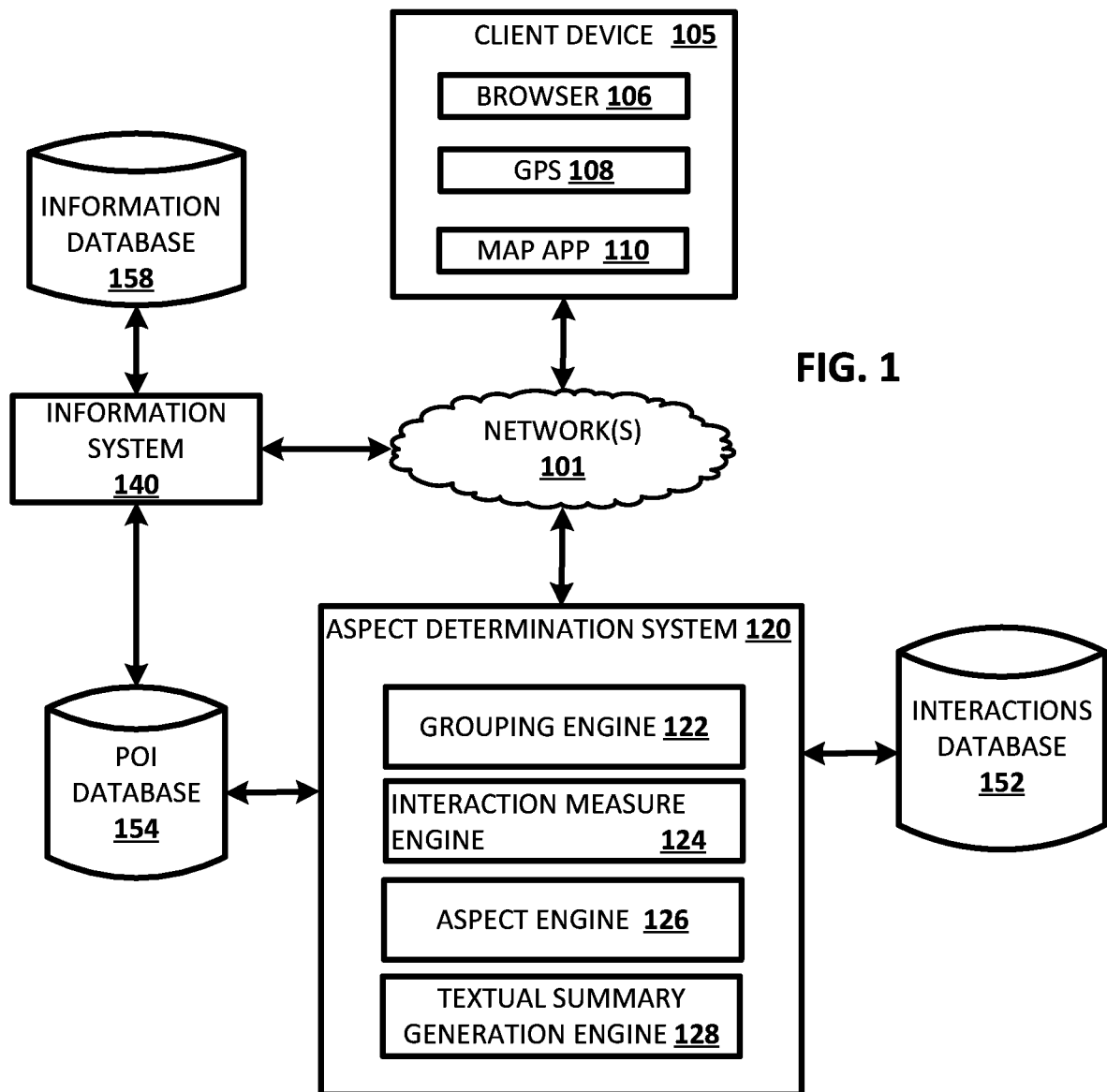
FIG. 1 illustrates an example environment in which textual summaries about physical locations may be generated based on computing interactions pertaining to the physical locations.

FIG. 1 illustrates an example environment in which aspects of physical locations (also referred to herein simply as "locations") may be determined, and/or textual summaries generated, based on computing interactions (also referred to herein as "interactions") that pertain to and/or are associated with the physical locations. The example environment includes a client device 105, an aspect determination system 120, and an information system 140. Aspect determination system 120 may be implemented in one or more computers that communicate, for example, through a network (not depicted). Aspect determination system 120 is an example of a system in which the systems, components, and techniques described herein may be implemented and/or with which systems, components, and techniques described herein may interface.

Client device 105, aspect determination system 120, and information system 140 each include one or more memories for storage of data and software applications, one or more processors for accessing data and executing applications, and other components that facilitate communication over a network. The operations performed by aspect determination system 120, and/or information system 140 may be distributed across multiple computer systems.

Client device 105 may be a computer coupled to the aspect determination system 120, the information system 140, and/or other component (e.g., interactions database 152 and/or a component managing interactions database 152) through one or more networks 101 such as a local area network (LAN) or wide area network (WAN) such as the Internet. The client device 105 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided.

As described herein, in determining aspects of physical locations, aspect determination system 120 may utilize interactions from interactions database 152 that are indicative of computing interactions by users that pertain to the physical locations. One or more of the computing interactions may be indicative of activities of users via computing devices such as client device 105. For the sake of brevity, only a single client device 105 is illustrated in FIG. 1 and described in some examples herein. However, activities of multiple users via multiple client devices may be utilized in determining aspects of physical locations. Moreover, although a user will likely operate a plurality of computing devices, and aspects of physical locations may be determined based on user actions via multiple of the computing devices, for the sake of brevity, certain examples described in this disclosure will focus on the user operating client device 105.

Client device 105 may operate one or more applications and/or components such as those that facilitate user selections and/or input that may be indicative of a computing interaction pertaining to a physical location, those that provide location data that may be indicative of a user interaction related to a physical location, and/or those that facilitate provision of search results, suggestions, and/or other information related to physical locations based on output of information system 140. These applications and/or components may include, but are not limited to, a browser 106, a position coordinate component, such as a global positioning system ("GPS") component 108 (other position coordinate technologies such as cellular or Wi-Fi-based triangulation may be used), a mapping application 110 (e.g., to obtain driving directions to or from the location), and so forth. In some instances, one or more of these applications and/or components may be operated on multiple client devices operated by the user. Other components of client device 105 not depicted in FIG. 1 that may provide indications of interactions of the user with a physical location may include, but are not limited to, a calendar application (e.g., based on an entry identifying the location), a phone application (e.g., based on a call to or from a number associated with the location), an email application (e.g., based on an e-mailed receipt from the location, e-mailed reservations for the location), a social networking application (e.g., based on a post related to the location, a check-in to the location, a review of the location), a virtual wallet application (e.g., based on a purchase associated with the location), a search application (e.g., based on searches associated with the physical location), a camera application (e.g., based on a geotag included in photos captured via the camera), and so forth. Some of the aforementioned example components may be standalone components or may optionally be accessed via the browser 106 or another component.

Interactions database 152 may store records of computing interactions by a plurality of users that pertain to physical locations. Generally, a computing interaction of interactions database 152 that pertains to a physical location includes an identifier of that physical location such as an address (e.g., latitude/longitude, street address), an alias, and/or an entity identifier. The computing interaction may optionally include additional information related to the interaction such as, for example, a date of the interaction, time(s) associated with the interaction (e.g., a single time, a time range, and/or time indicative of duration of the interaction), a confidence measure (e.g., based on confidence in the source of the interaction), and so forth. Computing interactions that may be logged in interactions database 152 include, for example, directional queries seeking driving directions to the locations, searches related to the locations, location data from mobile devices, check-ins to the locations, reviews of the locations, calendar entries identifying the locations, media items that include geotags identifying the locations, extracted reservation or receipt information (e.g., extracted from emails) related to the locations, browsing history of the user related to the locations (e.g., indicating one or more documents accessed by the user such as webpages), and/or starring or otherwise flagging the locations on a map and/or other interface.

Various components may provide indication of computing interactions for storage in interactions database 152 and a separate component may optionally maintain interactions database 152. Examples of components that may provide interactions for storage in interactions database 152 include, for example, client device 105 and other computing devices of other users, information system 140 and other systems, an email system executing on one or more computing devices, navigation systems and/or GPS-enabled devices, and/or one or more other components that may identify interactions with a location. Although only a single interactions database 152 is illustrated, in various implementations interactions database 152 may include multiple databases. For example, a first database may include directional queries related to locations and a second database may include location data from mobile computing devices of users that are related to locations. In some implementations, interactions database 152 may include entries of a plurality of users and access to entries of a user in database may be allowed for only the user and/or one or more other users or components authorized by the user such as aspect determination system 120.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Point of interest ("POI") database 154 may include a collection of entities, and for each of one or more of the entities, a mapping to one or more properties associated with the entity and/or one or more other entities related to the entity. For example, the POI database 154 may be a knowledge graph, such as a local knowledge graph that includes entities associated with businesses and/or other locations and includes properties for each of the entities such as phone numbers, addresses, open hours, most popular hours, etc.

In some implementations, POI database 154 may be utilized to identify one or more locations that are associated with computing interactions of interactions database 152. For example, physical locations identified in POI database 154 may be associated with an address, longitude and latitude, and/or other coordinates that may be utilized to map interactions of interactions database 152 with physical locations. Also, for example, each of one or more physical locations identified in POI database 154 may be associated with one or more aliases for the physical location and/or aliases for properties of the location and those aliases may be utilized to map interactions of interactions database 152 with physical locations.

In various implementations, grouping engine 122 may utilize information from POI database 154 to determine a group of interactions from interactions database 152. For example, grouping engine 122 may identify a point of interest in POI database 154 that is associated with longitude and latitude coordinates and further determine a group of interactions that are associated with those same longitude and latitude coordinates and/or associated with coordinates within a threshold distance of those longitude and latitude coordinates. For instance, grouping engine 122 may identify Restaurant 1 and a latitude and longitude for Restaurant 1 from POI database 154. Grouping engine 122 may further determine a group of interactions that are associated with locations that are within 50 yards of the identified latitude and longitude of Restaurant 1. Also, for example, Restaurant 1 may be associated with a street address in POI database 154 and grouping engine 122 may identify one or more interactions from interactions database 152 that include navigational directions to the street address of Restaurant 1. Also, for example, grouping engine 122 may identify one or more aliases for Restaurant 1 in POI database 154 and determine a group of interactions from interactions database 152 that are associated with the one or more of the aliases (and optionally associated with additional properties such as a location near Restaurant 1 or an alias of a category associated with Restaurant 1).

In this specification, the term "database" will be used broadly to refer to any collection of data. The data of the database does not need to be structured in any particular way, or structured at all, and it can be stored on storage devices in one or more locations. Thus, for example, the databases 152, 154, and/or 158 may each include multiple collections of data, each of which may be organized and accessed differently. Also, for example, all or portions of the databases 152, 154, and/or 158 may be combined into one database and/or may contain pointers and/or other links between entries in the database(s). Also, in this specification, the term "entry" will be used broadly to refer to any mapping of a plurality of associated information items. A single entry need not be present in a single storage device and may include pointers or other indications of information items that may be present on other storage devices. For example, an entry that identifies a computing interaction in interactions database 152 may include multiple nodes mapped to one another, with each node including an identifier of an entity or other information item that may be present in another data structure and/or another storage medium.

Aspect determination system 120 may determine one or more aspects to assign to a location based on computing interactions of users that pertain to the location. In various implementations, aspect determination system 120 may include a grouping engine 122, an interaction measure engine 124, an aspect engine 126, and/or a textual summary generation engine 128. In some implementations, one or more of engines 122, 124, 126, and/or 128 may be omitted. In some implementations, all or aspects of one or more of engines 122, 124, 126, and/or 128 may be combined. In some implementations, one or more of engines 122, 124, 126, and/or 128 may be implemented in a component that is separate from aspect determination system 120.

Generally, grouping engine 122 determines groups of computing interactions that are each associated with a physical location or a group of physical locations. For example, grouping engine 122 may determine a group of computing interactions from interactions database 152 that includes computing interactions of users that pertain to a particular physical location such as a business, a landmark, a tourist attraction, or a park. As described herein, the grouping engine 122 may optionally take one or more additional parameters into account in determining a group of user interactions—that are in addition to the group being associated with a physical location or a group of physical locations. For example, the grouping engine 122 may determine a group of interactions that are associated with one or more physical locations and that are also associated with: one or more dates such as particular dates, particular date ranges, and/or particular day(s) of the week; one or more times such as a single time, a time range, and/or times indicative of durations of the interactions; at least a threshold confidence measure (e.g., based on confidence in the source of the interaction); one or more user attributes such as an attribute indicating a particular user group; one or more particular sources (e.g., only location data, only driving directions); and so forth.

For example, grouping engine 122 may determine a group of interactions of users at a location at one or more time periods (e.g., interactions of users at Restaurant 1 between 11 am and 1 pm). Also, for example, grouping engine 122 may determine a group of interactions that includes interactions of users at multiple locations of a category of locations within a geographic area (e.g., interactions of users with pizza restaurants in a particular neighborhood, or even within a particular geofence). Which parameters are utilized by grouping engine 122 in determining one or more groups of user interactions may be based at least in part on the desired aspect to be determined about a location. Examples are provided herein of example aspects that may be determined for a location and parameters that may optionally be taken into account in determining one or more groups of interactions for utilization in determining the example aspects.

In some implementations, grouping engine 122 may determine a first group of interactions associated with a location and determine a second group of interactions associated with one or more locations that are similar to the location (referred to herein as a "peer group"). For example, grouping engine 122 may determine a first group of interactions associated with a restaurant and determine a second group of interactions that includes interactions associated with other locations that have cuisine type(s), price(s), clientele, a geographic area, a location category (e.g., restaurant), and/or other attributes that are similar to attributes of the location. In some implementations, similarity may be defined to require exact matching between one or more attributes (e.g., the restaurant and the other locations must have a cuisine type in common) and/or soft matching between one or more attributes (e.g., the restaurant and the other locations must be associated with average prices that are within a threshold of one another). A geographic area may be defined with various levels of granularity such as a zip code, a neighborhood, a city, a region, an area code, and so forth.

In some implementations of determining a group, grouping engine 122 may determine that one or more interactions are outliers and not include the interactions in the group. Outlying interactions may be identified and removed from groups based on one or more techniques, such as truncated means and/or Winsorized means, and/or interactions that are below a threshold duration and/or above a threshold duration may be discarded. For example, grouping engine 122 may not include interactions that are associated with a duration of visit that is greater than a threshold as they may be indicative of interactions of employees instead of customers. Also, for example, grouping engine 122 may identify opening hours and/or closing hours of a location and determine that interactions from users that are present before opening time and/or after closing time are likely employees. Also, for example, in some implementations one or more interactions may be associated with a confidence level and only interactions that satisfy a threshold confidence level may be included by grouping engine 122 in a group of interactions. For example, an interaction that indicates multiple potential locations may be associated with a low confidence level if an exact location may not be accurately determined (e.g., the interaction may be based on inaccurate location data that indicates an area that encompasses multiple points of interest). In some implementations, grouping engine 122 may determine a group of interactions associated with a physical location only when the count of indicated interactions satisfying parameters for that group satisfies a threshold. For example, grouping engine 122 may determine a group of computing interactions only when the count of indicated interactions for the group is above 100 interactions. In some implementations, grouping engine 122 may determine a group of computing interactions associated with a physical location only when the count of users who have interactions satisfying parameters for that group satisfies a threshold. For example, grouping engine 122 may determine a group of computing interactions only when the group includes interactions from at least X number of users. In some implementations, groups of interactions may be fit to a distribution, such as a log-normal distribution and/or a Weibull distribution, and the parameters of the distribution may be utilized by one or more components.

Interaction measure engine 124 may determine one or more computing interaction measures based on the one or more groups of computing interactions determined by grouping engine 122. For example, grouping engine 122 may determine a group of interactions that includes computing interactions by that pertain to a location and interaction measure engine 124 may determine one or more measures indicative of durations of interactions of the users indicated by the group of interactions. In some implementations, the measures may include an average or median duration of visits (e.g., as indicated by a length of time a user's GPS reading remains within a particular radius, or the time between an ingress and egress GPS reading). In some implementations, the measures may additionally or alternatively include a continuous or discrete distribution of durations of visits, e.g., a mean with a standard deviation, a vector including all lengths of visits or a count of lengths of visits for one or more durations (e.g., a count of durations from 0-5 minutes, a count of durations from 5-10 minutes, etc.), and so forth. Also, for example, interaction measure engine 124 may determine, based on a group of interactions for a location, one or more measures indicative of a quantity of visits of users to the location. For instance, the measures may include one or more of a raw count of the interactions of the group, an average and/or median count per day or other time period, and/or a continuous or discrete distribution of quantity of interactions (e.g., a mean with a standard deviation, a vector including raw counts or averages for each of a plurality of time periods (e.g., a count of interactions each day for the past two weeks; a count of interactions during a first time period, a second time period, etc.)). Which measures are determined by interaction measure engine 124 may be based at least in part on the desired aspect to be determined about a location.

In some implementations, interaction measure engine 124 may determine an interaction measure that is based on an average of one or more of the interactions of the group of interactions. For example, grouping engine 122 may determine a group of location data interactions for a location between the hours of 11 am and 1 pm (i.e., lunch hours) on multiple dates and interaction measure engine 124 may determine an interaction measure indicative of an average duration of interactions with the location that initiate during that time. Also, for example, grouping engine 122 may determine a group of location data interactions for the location between the hours of 5 pm and 9 pm (i.e., dinner hours) on multiple dates and interaction measure engine 124 may determine an interaction measure indicative of an average duration of interactions with the location that occurred during that time.

In some implementations, interaction measure engine 124 may determine one or more measures indicative of quantities of interactions during a plurality of discrete intervals. For example, grouping engine 122 may determine a group of interactions of users with Restaurant 1 and interaction measure engine 124 may determine an interaction measure that indicates the number of interactions that occurred between 11 am and 12 pm, between 12 pm and 1 pm, between 1 pm and 2 pm, etc. Also, for example, grouping engine 122 may determine a group of interactions for all restaurants in the same city as Restaurant 1 and interaction measure engine 124 may determine an interaction measure that indicates the average number of interactions per restaurant for the same discrete intervals.

In some implementations, interaction measure engine 124 may determine one or more interaction measures based on confidence values associated with the interactions. For example, interactions with a location may be associated with confidence values indicative of a degree of confidence the interaction indicates actual interaction with the location, as described herein. Interaction measure engine 124 may utilize associated confidence values to weight one or more of the interactions. As an example, interaction measure engine 124 may weight an online check-in of a user at a location more heavily than a non-directional search related to the location.

Aspect engine 126 may determine an aspect of a location based on the one or more interaction measures determined by interaction measure engine 124, and may assign the aspect to the location. For example, the aspect engine 126 may associate the aspect with the location in POI database 154. As one example of determining an aspect, interaction measure engine 124 may determine an interaction measure that indicates an average interaction time at a restaurant location, and aspect engine 126 may compare that interaction measure to a second measure to determine whether the restaurant location is a "quick bites" location or a longer "sit down" location. For example, the second measure may be a threshold such as 30 minutes and if the interaction measure is less than the threshold, the aspect of the restaurant may be indicative of a "quick bites" location. Also, for example, the second measure may be based on an average interaction time of other similar locations (e.g., other restaurants in the area and/or other restaurants of the same type), and if the interaction measure is less than the average, or more than a threshold less than the average, the aspect of the restaurant may be indicative of a "quick bites" location. As another example of determining an aspect, interaction measure engine 124 may determine a first computing interaction measure that indicates the average quantity of daily dinnertime interactions with a restaurant over the last 6 months and a second computing interaction measure that indicates the average quantity of daily dinnertime interactions with the restaurant over the last week. The aspect engine 126 may determine that the second computing interaction measure indicates an increase in interactions relative to the first computing interaction measure and determine an aspect of "trending up" for the restaurant.

In some implementations, aspect engine 126 may optionally utilize one or more rules in determining aspects for locations. For example, a first rule may be utilized to determine a first aspect for all locations or a class of locations and a second rule may be utilized to determine a second aspect for all locations or a class of locations. As one example of a rule that may be utilized, aspect engine 126 may identify a location has an aspect indicative of "trending up" based on determining that a difference between a first measure indicative of a quantity of more recent in time interactions and a second measure indicative of a quantity of less recent in time interactions satisfies a threshold value, percentage, and/or proportion. For instance, aspect engine 126 may determine that a restaurant is trending up if the first computing interaction measure and the second computing interaction measure are indicative of an increase in interactions of at least 20% (e.g., a restaurant may have an aspect of "trending up" if a first measure indicative of an average quantity of daily interactions over the last week is 50% greater than a second computing interaction measure of an average quantity of interactions over the last six months). As another example of a rule that may be utilized, aspect engine 126 may identify a location has an aspect indicative of "trending up slightly" based on determining that a difference between a first measure indicative of a quantity of more recent in time interactions and a second measure indicative of a quantity of less recent in time interactions satisfies a first threshold value, and an aspect of "trending up significantly" if the difference satisfies a second threshold value. Which techniques are employed by aspect engine 126 to determine an aspect may be based at least in part on the desired aspect to be determined, the group(s) determined by grouping engine 122, and/or based on the interaction measures determined by interaction measure engine 124. Examples are provided herein of example aspects that may be determined for a location and one or more example techniques that may optionally be utilized in determining the aspects.

In some implementations, aspect engine 126 may determine an aspect of a location based on multiple groups of interactions for the location. As one example, grouping engine 122 may determine a first group of interactions for a location during lunch hours and a second group of interactions for the location during dinner hours. Interaction measure engine 124 may determine a first measure indicative of average user interactions at lunch (based on the first group) and a second measure indicative of average interactions at dinner (based on the second group). Aspect engine 126 may determine an aspect indicative of the location being "more popular for lunch than dinner" based on determining that the first measure is greater than the second measure and/or based on determining that the proportion of interactions that occur during lunch (i.e., the first measure) is indicative of the location having more business during lunch than during dinner. As another example, grouping engine 122 may determine a first group of interactions for a location that are associated with weekdays and a second group of interactions that are associated with weekends. Interaction measure engine 124 may determine a first measure that is indicative of average daily interactions on the weekdays (based on the first group) and a second measure that is indicative of average daily interactions on the weekends (based on the second group). Aspect engine 126 may determine an aspect that indicates whether the location is more popular on weekdays or weekends. For example, aspect engine 126 may determine an aspect of "Popular Weekday Location" if the interactions measures determined by interaction measure engine 124 are indicative of more average daily weekday interactions than weekend interaction. As yet another example, aspect engine 126 may determine that a location has recently opened or closed based on comparing a first computing interaction measure indicative of a quantity of interactions with the location over a recent time period (e.g., the last 5 days) to a second computing interaction measure indicative of a quantity of interactions over a time period that includes less recent in time interactions (e.g., the last 3 months, optionally including the last 5 days). For example, if the comparison indicates a significant increase in interactions, an aspect of "recently opened" may be determined for the location. Also, for example, if the comparison indicates a significant decrease in interactions and the first computing interaction measure indicates relatively few or no recent interactions, an aspect of "recently closed" may be determined for the location.

In some implementations, aspect engine 126 may determine an aspect of a location based on comparing a first computing interaction measure determined based on a group that includes only interactions with the location to a second computing interaction measure determined based on a group that includes interactions with one or more other locations that are in addition to the location. For example, grouping engine 122 may determine a first group of interactions for all Italian restaurants in a geographic area and interaction measure engine 124 may determine a first computing interaction measure based on the group that is indicative of the average quantity of daily interactions per restaurant. Additionally, grouping engine 122 may determine a second group of interactions for a particular Italian restaurant in the geographic area and interaction measure engine 124 may determine a second computing interaction measure based on the second group that is indicative of the average quantity of daily interactions with the particular Italian restaurant. Based on comparing the first measure to the second measure, aspect engine 126 may determine an aspect that is indicative of the popularity of the particular Italian restaurant. For example, the aspect may be indicative of the restaurant being a popular Italian restaurant if the average quantity of daily interactions for the restaurant is greater than the average quantity of daily interactions for all Italian restaurants in the geographic area.

Textual summary generation engine 128 may be configured to automatically generate one or more textual summaries about a physical location based on signals provided by various components, such as interaction measure engine 124 and/or aspect engine 126. For example, in some implementations, textual summary generation engine 128 may be configured to automatically generate a textual description of a physical location based on comparison of two or more interaction measures. This comparison may be the same comparison that yields one or more aspects that are assigned to the physical location, and in fact, in some implementations, textual summary generation engine 128 may additionally or alternatively automatically generate a textual description of a physical location based on one or more aspects assigned to the physical location. Textual summaries may fall into various categories, including textual summaries that describe a physical location in comparison to a "peer group" of similar locations (the peer group may include the location itself, too), and textual summaries that describe absolute characteristics of a physical location.

Textual summaries that compare a physical location to a peer group may include textual summaries that compare the physical location to other physical locations (i.e. the peer group) that satisfy one or more criteria. For example, the textual summary "most searched for Indian restaurant in Silicon Valley" compares the physical location (an Indian restaurant in Silicon Valley) to a peer group of Indian restaurants in Silicon Valley. "The most popular bakery in Deer Park" compares the physical location (a bakery in Deer Park) to a peer group of bakeries in Deer Park. "The cheapest French restaurant with a full bar in Queens" compares the physical location (a French restaurant in Queens) to a peer group of French restaurants in Queens that have full bars.

The peer group to which a physical location is compared may be selected based on one or more criteria. These criteria may include but are not limited to being located within a particular geographic area, being of a particular category (e.g., Indian restaurant, Italian restaurant, Mexican restaurant, bar, bakery, coffee shop, etc.), selling goods/services within a particular price range, having one or more characteristics (quiet ambiance, outdoor seating, full bar, waterfront view, live music, etc.), and so forth.

The one or more criteria for including physical locations in a peer group may be selected, e.g., by grouping engine 122, based on various signals. These signals may come from various sources, such as client device 105 (directly or indirectly), or from information system 140. One such signal is a particular location of potential interest for a user. If the user indicates (explicitly or implicitly) potential interest in booking a room at a particular fancy hotel, then criteria for selecting a peer group of hotels may include hotels having a similar price range as the particular hotel, or other hotels that best match the user's particular preferences (e.g., hotels having particular number of stars, hotels with gyms, etc.).

Another signal for determining one or more criteria for including physical locations in a peer group is contextual data associated with a user computing device. Contextual data associated with a user's computing device (e.g., smart phone, smart watch, smart glasses, etc.) may include but is not limited to position coordinates (e.g., obtained using GPS 108 or other means such as cellular triangulation), a search engine query performed using browser 106, a directional query performed using mapping application 110, and so forth. Suppose a user is located in a particular neighborhood (e.g., as determined by her GPS coordinates) and uses her phone to search for "inexpensive Italian restaurants." Based on the user's context, grouping engine 122 may obtain, e.g., from interactions database 152, computing interactions that pertain to Italian restaurants within a geographic area (e.g., determined based on her position coordinates) that satisfy a particular price range (e.g., "$" or "$$"). If a particular Italian restaurant that fits these criteria is determined, e.g., by interaction measure engine 124 and/or aspect engine 126, to be more popular than the rest of its peers, then textual summary generation engine 128 may generate a textual summary for that restaurant, such as "The most popular inexpensive Italian restaurant in the neighborhood," or something to that effect. If another Italian restaurant that fits these criteria is determined, e.g., by interaction measure engine 124 and/or aspect engine 126, to have better outdoor seating than the rest of its peers, then textual summary generation engine 128 may generate a textual summary for that restaurant, such as "The best outdoor seating for an inexpensive Italian restaurant in the neighborhood," or something to that effect.

Another signal for selecting the one or more criteria for including physical locations in a peer group may additionally or alternatively be contextual data associated with a user (as opposed to the user's computing device). Suppose an online calendar entry associated with a user indicates that the user is scheduled to be in a particular geographical area soon after lunch. Suppose further that the user uses her phone to search for "quick lunch spots." Grouping engine 122 may select, e.g., from interactions database 152, interactions that pertain to locations at or near that geographic location that are known to provide relatively fast lunch options. Other user-related contextual data that may be used to determine criteria for selecting a peer group of physical locations may include user preferences, user budget, user social network status updates, and so forth.

Another signal for selecting the one or more criteria for including physical locations in a peer group may additionally or alternatively be non-user related information such as a population or size of a geographic area. For example, suppose the user is located in Hollywood and searches for "Indian food." A textual summary describing a particular search result as "the best Indian restaurant in California" would not be as useful as, for example, "the best Indian restaurant in Los Angeles." Thus, a size and/or population of a geographic area associated with a user's location may be used, e.g., by grouping engine 122, to determine criteria for selecting interactions from interactions database 152. In some implementations, if a particular physical location is unique within a geographic area (or more generally, the sole member of a particular peer group), a special textual summary may be generated, e.g., by textual summary generation engine 128, such as "the only bourbon bar in St. Matthews."

Another categories of textual summaries includes textual summaries that describe a physical location in its own, absolute terms, rather than in comparison to a peer group of other physical locations. Computing interactions that pertain to a physical location may be analyzed, for instance, in terms of different time periods (e.g., lunch hours versus dinner hours), as described above. Examples of absolute summaries include but are not limited to "a significant number of visitors come revisit this location," "this place is getting busier," "this spot is more popular for brunch than for dinner," and so forth. In various implementations, such textual summaries may be generated, for instance, by textual summary generation engine 128 based on one or more aspects assigned to a physical location by aspect engine 126.

Generally, information system 140 utilizes aspects that have been determined by aspect determination system 120, and/or textual summaries generated by textual summary generation engine 128, in providing information to a user. The information system 140 may utilize the aspects and/or textual summaries, for example, in determining the information to provide (e.g., the aspects may be included in the information) and/or determining when or how to provide the information (e.g., the aspects may be utilized to select the information and/or to rank the information relative to other information). For example, information system 140 may identify user interest in one or more locations and provide information related to the one or more locations based on determined aspects of the locations. In some implementations, textual summary generation engine 128 may be integral with information system 140 instead of with aspect determination system 120. In other implementations, textual summary generation engine 128 may be a standalone component independent from aspect determination system 120 and information system 140.

Information system 140 may be, for example, a search engine, a notification and/or suggestion system, and/or one or more other systems that may provide information related to locations to a computing device of a user based on implicit and/or explicit indications from the computing device (e.g., based on a query from the computing device, a selection of a user via the computing device, based on access of an application via the computing device such as access of a suggestion system). Information system 140 may optionally be in communication with information database 158. Information database 158 may include information that may be utilized by information system 140 to provide information to the user. For example, information database 158 may include an index of documents, webpages, and/or other information items that may be utilized to identify information to provide to the user. As one example, information system 140 may be a search engine and the information database 158 may be a search index utilized to identify documents responsive to search queries. As described herein, such documents may optionally be ranked for search queries based on determined aspects that are associated with the documents. In some implementations, information system 140 and/or another component may optionally update information database 158 based on aspects determined by aspect engine 126 and/or textual summaries generated by textual summary generation engine 128. For example, when information database 158 is an index of webpages and other documents, the index may be updated to include information related to aspects determined herein (e.g., a webpage associated with a location may be indexed based on determined aspects of that location).

In some implementations, information system 140 may select and/or rank search results responsive to a submitted search query based on determined aspects. For example, a user may provide a search query of "trendy lunch places" and information system 140 may identify information in information database 158 related to one or more nearby locations that are restaurants. Based on inclusion of "trendy" in the search query, the information system 140 may further identify that one or more of the identified locations are associated with determined aspects that are indicative of serving lunch and/or of recently "trending up" in popularity. The information system 140 may select such identified locations for providing in response to the search query and/or promote the ranking of such locations in search results provided in response to the search query. As another example, a user may provide a query of "new restaurants" and information system 140 may identify one or more locations in POI database 154 that are associated with an aspect indicating that the restaurant has recently opened (e.g., based on presence of "new" in the search query) and select information related to such locations for providing in response to the query and/or for providing more prominently in response to the query.

In some implementations, one or more search results may be selected and/or ranked based on determined aspects, even when terms of a query do not indicate interest in the determined aspects. For example, the user may provide a search query of "Italian restaurants" and information system 140 may identify one or more webpages responsive to the query via information database 158. Information system 140 may identify one or more locations in POI database 154 that are associated with the webpages and further identify one or more aspects associated with the locations. Information system 140 may provide search results that include local Italian restaurants and restaurants that have been associated with a "trending up" aspect may be promoted and/or otherwise displayed more prominently than one or more other search results.

As described, in some implementations, information system 140 may provide information related to a location independent of any query submission of a user. For example, information system 140 may be a notification or suggestion system that may provide information related to locations having "highly popular" or "trending up" aspects to a user without the user submitting a query related to the location. For instance, the information may be "pushed" to the user and/or provided in response to the user accessing the suggestion system or selecting an interface element in the suggestion system. Also, for example, information system 140 may provide one or more suggestions responsive to a selection of the user that is not the user explicitly typing, speaking, or otherwise inputting a query. For instance, the user may select a user interface element to request "popular restaurants" nearby and information system 140 may select information related to one or more restaurants based on determined aspects that indicate the restaurants are "popular". Also, for example, information system 140 may be a mapping application that may provide a map with various points of interest for display on a computing device of a user. Information system 140 may determine to include one or more of the points of interest based on association of the points of interest to one or more determined aspects and/or may determine to display one or more of the points of interest more prominently and/or with associated textual summaries generated by textual summary generation engine 128. Also, for example, a "recently opened" location may be promoted in ranking of information provided to a user. For example, the user may not be provided with restaurants in a location if the user is familiar with the area. A restaurant that is associated with an aspect of "recently opened" may be provided to the user even if the user is familiar with the area and would not otherwise be provided restaurants in the area.

While depicted as separate components in FIG. 1, in various implementations, all or part of aspect determination system 120 and/or information system 140 may optionally be combined. Also, in some implementations, information system 140 may be omitted.

Figure 2:
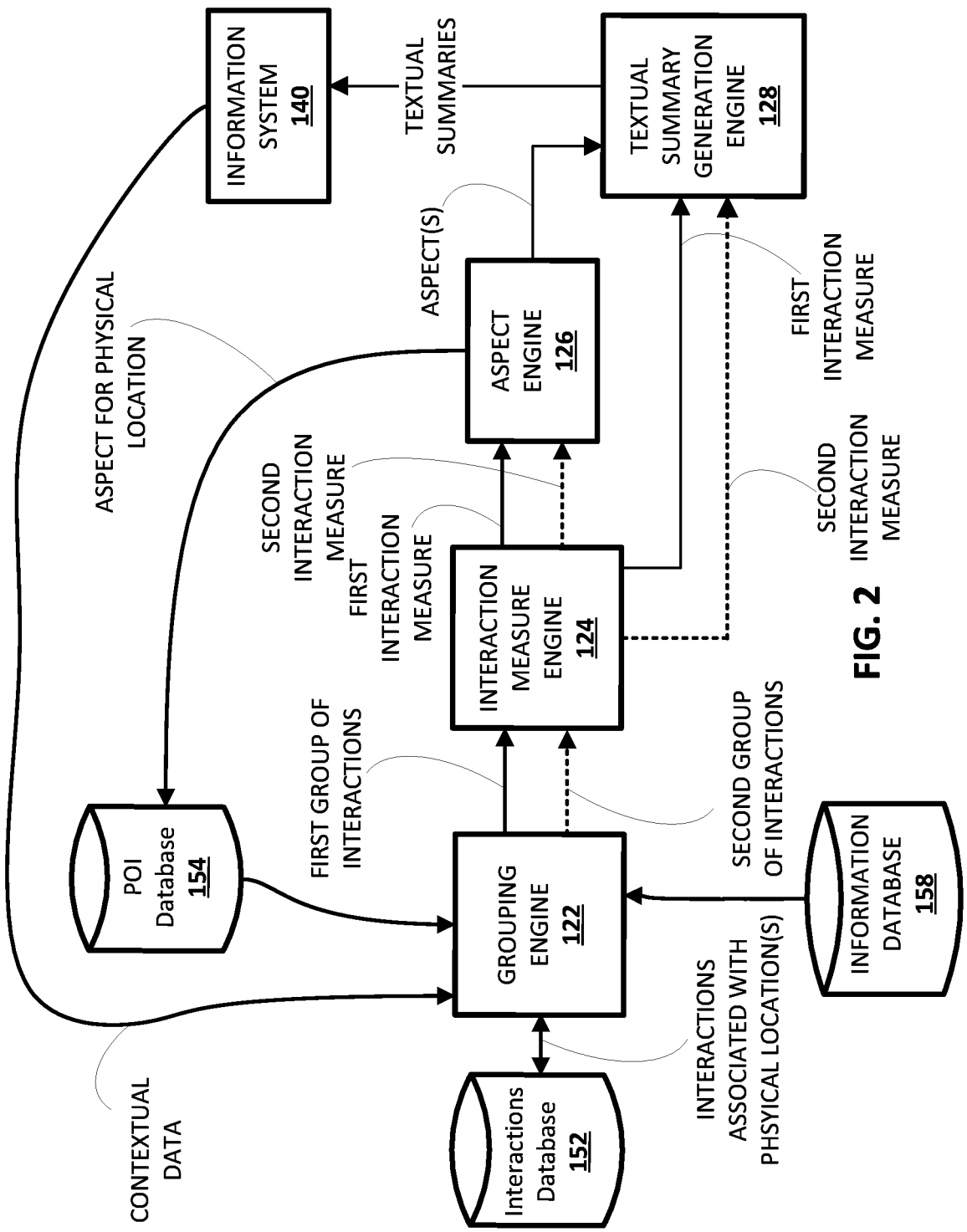
FIG. 2 illustrates an example of how an aspect of a physical location may be determined and assigned to the physical location, and how a textual summary about the physical location may be generated, based on computing interactions that pertain to the physical location.

FIG. 2 illustrates an example of how an aspect of a physical location may be determined and assigned to the physical location, as well as how one or more textual summaries may be generated and provided to information system 140, based on computing interactions pertaining to a physical location. Computing interactions pertaining to locations are stored in interactions database 152. Grouping engine 122 may be configured to determine a group of interactions that includes interactions for a particular location, for a peer group of locations, for a category of users, for one or more particular times of day, and/or based on one or more other criteria. In some implementations, grouping engine 122 may identify physical locations based at least in part on information in POI database 154. For example, grouping engine 122 may identify a location in POI database 154 and determine a group of computing interactions that pertain to the identified location (e.g., all interactions with the location, interactions at one or more times of day and/or over a period of time). Also, for example, grouping engine 122 may determine computing interactions of interactions database 152 that pertain to a particular location based on other information in POI database 154 (e.g., based on mapping interactions to aliases, addresses, or other information of a location in POI database 154).

As an example, grouping engine 122 may identify a location of Restaurant 1, an Italian restaurant, and the coordinates and/or address of the location. Grouping engine 122 may further determine a group of computing interactions from interactions database 152 that includes computing interactions that pertain to Restaurant 1 over the past month. Grouping engine 122 may provide one or more groups of computing interactions to interaction measure engine 124 to determine one or more interaction measures for each group. For example, for each of the groups, interaction measure engine 124 may determine an interaction measure that is indicative of an average number of interactions per day. Also, for example, interaction measure engine 124 may determine an interaction measure that indicates an average number of interactions per hour of each day over the time period of the interactions of each group. Interaction measure engine 124 may provide the interaction measures to aspect engine 126.

In some implementations, only one group of interactions may be determined and only one interaction measure may be determined for a location, as represented by the dotted lines for the second group of interactions and second computing interaction measure in FIG. 2 (indicating those aspects are optional). For example, the first computing interaction measure may be percentages of the total interactions that occurred per hour at the location (e.g., 5% of total average interactions occurred between 10 am and 11 am, 15% of total average interactions occurred between 11 am and 12 pm, etc.). The second measure may not be determined from a group of interactions but may instead be a threshold value.

For example, the second measure may be a threshold value of 85% of interactions during lunchtime, and aspect engine 126 may determine that the location is a lunch restaurant by comparing the threshold value to the percentage of total interactions per hour for lunch hours.

Aspect engine 126 may determine one or more aspects for the location based on the interaction measures and associate the aspects with the location in the POI database 154. For example, interaction measure engine 124 may determine a first computing interaction measure that indicates the average interactions during lunchtime for the month that is most recent in time and a second computing interaction measure that indicates the average interactions during lunchtime for the last six months. Aspect engine 126 may determine an aspect of "trending in popularity for lunch" by comparing the interaction measures and determining that the average lunchtime interactions has increased by at least a threshold amount.

As another example of an aspect that may be determined for a location, aspect engine 126 may determine an aspect that indicates whether the customers of a location are loyal to the location (and optionally the extent of the loyalty). For example, grouping engine 122 may determine a group of interactions of users with Restaurant 1. Interaction measure engine 124 may determine, based on the group, an interaction measure that indicates the number of users that have interacted with the location once, the number of users that have interacted with the location twice, three times, etc. Also, for example, interaction measure engine 124 may determine a second measure that indicates the average number of times a group of users has interacted with other locations once, twice, three times, etc. (e.g., based on groups that include interactions of additional locations such as other restaurants of a similar price range in the same area). Aspect engine 126 may determine an aspect that indicates the restaurant has a loyal clientele by comparing the counts (or proportion) of repeat customer of the location with the repeat customer count (or proportion) of one or more other locations (e.g., the more repeat customers, the more loyal).

As another example of determining a customer loyalty aspect of Italian Restaurant A, a group of interactions may be determined that are associated with Italian Restaurant A. If it is desirable to determine loyalty among users having certain attributes, in some implementations the interactions of the group may optionally be selected by grouping engine 122 based on an association with one or more of those attributes. An interaction measure indicative of a measure of repeat interactions with Italian Restaurant A may be determined by interaction measure engine 124 based on the group of interactions. For instance, the interaction measure may be an average quantity of interactions by users, a median quantity of interactions by users, and/or a continuous or discrete distribution of quantity of interactions (e.g., a mean with a standard deviation, a vector including raw counts or frequencies for each of a plurality of interaction quantities such as one interaction, two interactions, three interactions, etc.).

As another example, grouping engine 122 may determine a group of computing interactions for Restaurant 1 and additionally determine a group of computing interactions for a group of other Italian restaurants. Interaction measure engine 124 may determine measures of interactions for Restaurant 1 and other Italian restaurants. Aspect engine 126 may determine an aspect of the restaurant related to the popularity of Restaurant 1 based on the interaction measures. For example, aspect engine 126 may determine that Restaurant 1 is a popular location to have Italian for dinner by determining that the interactions with Restaurant 1 at dinner is greater than an average number of interactions of other Italian restaurants at dinner.

As an example of determining an aspect of Italian Restaurant A that indicates trending of Italian Restaurant A, a group of computing interactions may be determined by grouping engine 122 that are associated with Italian Restaurant A and that are associated with a recent time period (e.g., the most recent X days). If it is desirable to determine trending among users having certain attributes, in some implementations the interactions of the group may optionally be selected by grouping engine 122 based on an association with one or more of those attributes. An interaction measure indicative of a quantity of interactions with Italian Restaurant A may be determined by interaction measure engine 124 based on the group of interactions. For instance, the interaction measure may be an average quantity of the interactions per day over the most recent X days. A second computing interaction measure may be determined from a second group of interactions that includes interactions over the next most recent X days. Aspect engine 126 may determine an aspect for the location based on comparing the first computing interaction measure and the second computing interaction measure. For example, aspect engine 126 may determine an aspect that the location is trending if the interaction measures indicate that the average interactions in the last X days is greater than in the X days before.

As shown in FIG. 2, textual summary generation engine 128 may generate textual summaries about physical locations based on computing interaction measures obtained from interaction measure engine 124 and/or based on one or more aspects obtained from aspect engine 126. In some implementations, textual summary generation engine 128 may obtain aspects from POI database 154, for instance, when those aspects were already assigned to a physical location in POI database 154 by aspect engine 126. In some implementations, textual summary generation engine 128 may provide (or otherwise make available) one or more textual summaries to information system 140. Information system 140 may then cause textual summaries to be presented to users in various ways, e.g., adjacent search results, as a pop-up, in a card, etc.

As represented by the arrow from information system 140 to grouping engine 122, in various implementations, grouping engine 122 may receive contextual data, e.g., pertaining to a user or the user's computing device, from information system 140. Grouping engine 122 may use this contextual information for various purposes. For example, grouping engine 122 may use the contextual data to determine one or more criteria for selecting a peer group of a particular physical location (e.g., a destination of a user's directional query). As another example, grouping engine 122 may use contextual data as a starting point (e.g., when the user has not provided a search) to determine potential implicit user interest in a particular location, and based on that potential interest, select one or more criteria for a peer group to the particular location.

Suppose grouping engine 122 receives a GPS signal that indicates a user is passing by a Mexican restaurant. Grouping engine 122 may identify a group of computing interactions in interactions database 152 that pertain to that Mexican restaurant. Grouping engine 122 may also identify a peer group of Mexican restaurants, e.g., in the same colloquial area (e.g., "Pacific Heights," "Butchertown," etc.). Interaction measure engine 124 may obtain interaction measures that indicate how often the Mexican restaurant is searched compared to how often Mexican restaurants of the peer group are searched, which aspect engine 126 may use to assign one or more aspects to the Mexican restaurant the user is passing by. Textual summary generation engine 128 may produce a textual summary (e.g., "second most searched Mexican restaurant in the area"), and information system 140 may provide that summary to the user at client device 105, e.g., as a "card" or other similar notification.

As represented by the arrow between information database 158 and grouping engine 122, in some implementations, grouping engine 122 may determine one or more criteria for selecting a peer group of a particular physical location based on other information beside contextual information. For example, in some implementations, grouping engine 122 may select a geographic area in which peer physical locations should be contained based on a physical size and/or population of a particular geographic area. For example, suppose a user passing through Brooklyn searches for "good Chinese restaurants." Grouping engine 122 may determine, e.g., based on information from information database 158, that a physical size/population of New York State makes it an unsuitable (too large) geographic area for selecting Chinese restaurants to include in a peer group. This decision may be based on one or more adjustable thresholds (e.g., population less than 50,000, geographic size less than 10 miles, etc.). Depending on how these one or more thresholds are adjusted, grouping engine 122 may make the same determination about New York City. However, if grouping engine 122 focuses in on Brooklyn, or perhaps even a colloquial region within Brooklyn, the one or more thresholds may be satisfied, and grouping engine 122 may select computing interactions pertaining to peer Chinese restaurants in that area.

Figure 3:
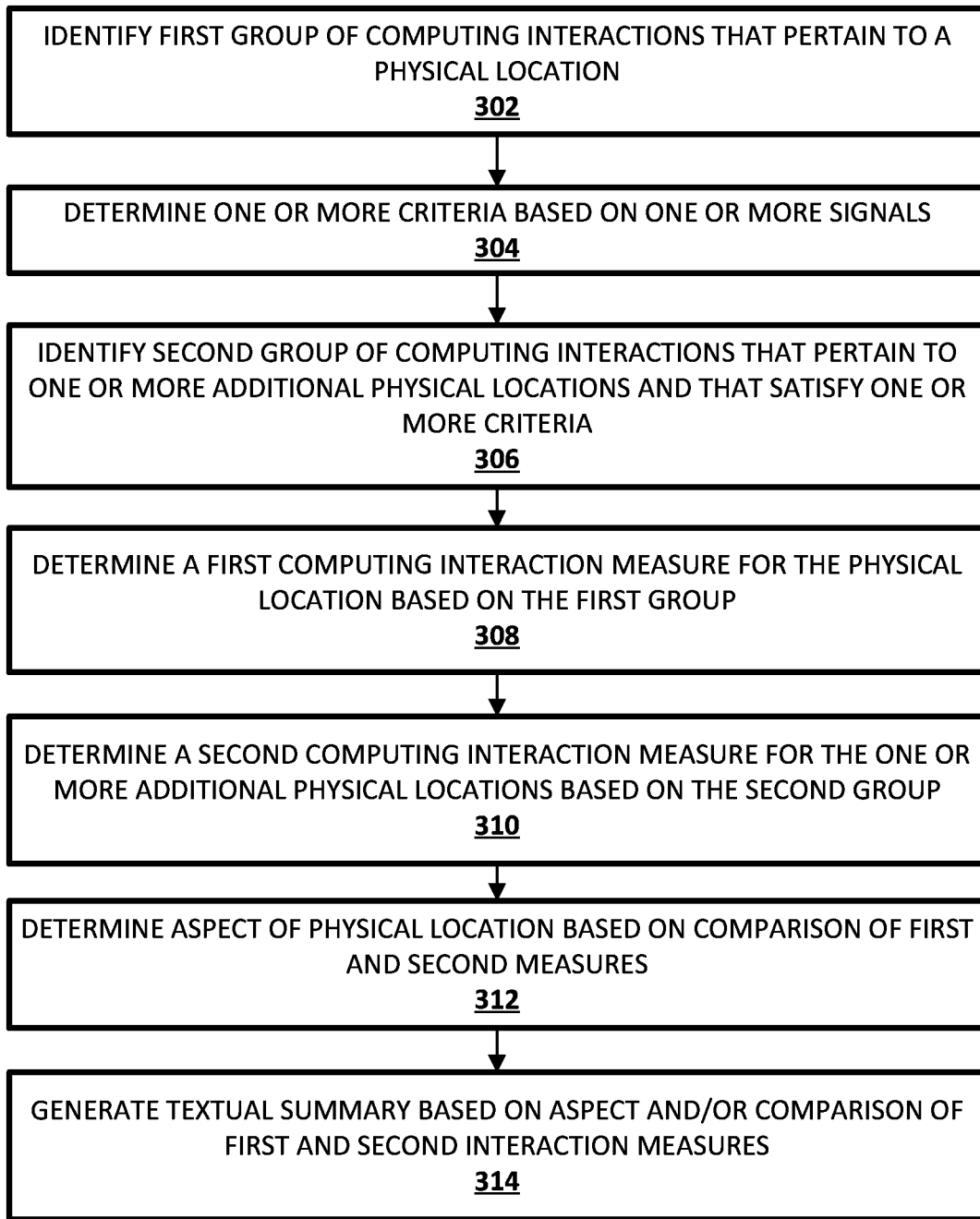
FIG. 3 is a flow chart illustrating an example method, in accordance with various implementations.

FIG. 3 is a flow chart illustrating an example method 300 of generating a textual summary for a physical location based on computing interactions pertaining to the physical location. For convenience, the operations of the flow chart are described with reference to a system that performs the operations. This system may include various components of various computer systems. For instance, some operations may be performed by one or more components of the aspect determination system 120, such as grouping engine 122, interaction measure engine 124, aspect engine 126, and/or textual summary generation engine 128. Moreover, while operations of the method of FIG. 3 are shown in a particular order, this is not meant to be limiting. One or more operations may be reordered, omitted or added.

At block 302, the system may identify a first group of computing interactions that pertain to a particular physical location. In some implementations, the system may select the particular physical location based on explicit activity of the user, such as the user searching for reviews about a particular hotel, or for directions to that hotel. In some instances, the system may select the particular physical location based on implicit activity (e.g., contextual) of the user, such as the user having a meeting scheduled in a particular area during lunch, coupled with the user's general preference for a particular cuisine. Suppose Sue is scheduled to attend a meeting in a neighborhood called Deer Park immediately following lunch, and that Sue generally prefers Indian cuisine that costs less than $20. The system may identify a closest Indian restaurant to the location of Sue's meeting, and may then identify one or more computing interactions pertaining to that Indian restaurant.

In some implementations, the first group of computing interactions may be identified by a component that shares one or more aspects with grouping engine 122. In some implementations, a group of interactions may be determined that includes interactions of users based on one or more characteristics of the users. For example, grouping engine 122 may determine a group of interactions that are associated with certain user attributes and/or certain user groups. In some implementations, grouping engine 122 may determine a group of interactions that occurred during a time period. For example, grouping engine 122 may determine a group of interactions that occurred during a particular week, month, day of the week, and/or during a particular time of day over a period of time (e.g., interactions during lunchtime over the last month).

At block 304, the system may determine one or more criteria for selecting one or more other physical locations as a peer group for the particular physical location. For example, contextual information associated with Sue and/or Sue's smart phone may indicate that Sue is located in Deer Park, likes Indian food, and has a particular budget for food. Other information, e.g., from information database 158, may indicate that Deer Park has a size that is too small (geographic size or population) to select a satisfactory peer group of physical locations, but that the city in which Deer Park is located is suitably sized for selection of a peer group.

At block 306, the system may identify a second group of computing interactions that pertain to one or more additional physical locations that satisfy the one or more criteria determined at block 304. For example, the system may select computing interactions associated with Indian restaurants within the city in which Deer Park is located, that also satisfy one or more of Sue's budgetary needs.

At block 308, the system may determine a first computing interaction measure for the particular physical location based on the interactions of the first group identified at block 302. The first computing interaction measure may be determined by a component that shares one or more characteristics with interaction measure engine 124. In some implementations, an interaction measure may be a statistic based on the interactions. For example, an interaction measure for a group of interactions may include an average of interactions over a period of time, an average number of interactions per hour over a period of time, and/or a proportion of average daily interactions that occurred each hour over a period of time (e.g., percentage of customers for the day that were lunch customers, percentage of customers for the day that were dinner customers). For example, the system may determine that the Indian restaurant close to Sue's meeting has been searched a particular number of times in the last month.

At block 310, the system may determine a second computing interaction measure based on the one or more computing interactions of the second group determined at block 306. For example, the system may determine numbers of times that other Indian restaurants in the city have been searched for by users in the last month. In other implementations, rather than relating to a peer group of physical locations, the second computing interaction measure may be one or more static or dynamic thresholds. For example, the first computing interaction measure may be indicative of duration of interactions with the location and the second measure may be a static threshold duration.

At block 312, the system may determine an aspect of the physical location based on a comparison of the first and second computing interaction measures. In some implementations, the aspect may be assigned to the physical location. The aspect of a physical location may be determined by a component that shares one or more characteristics with aspect engine 126 and may be assigned to the location based on association with the location in one or more databases such as POI database 154.

At block 314, the system may generate one or more textual summaries pertaining to the particular physical location. The textual summary may be generated by a component that shares one or more characteristics with textual summary generation engine 128. These one or more textual summaries may be generated based on comparison of two or more computing interaction measures (e.g., determined at blocks 308 and 310), or may be based on one or more aspects determined at 312.

In some implementations, the system may generate a textual summary using one or more of a plurality of template textual summaries. The system may select a template textual summary based in part on a type of computing interaction used to determine computing interaction measures at blocks 308 and 310. Table 1, below, provides a non-limiting example of a peer group-based lookup table that may be used to select a template textual summary, including a type of computing interaction analyzed and example thresholds that may be used to select from a plurality of potentially applicable template textual summaries.

TABLE 1

| Summary type | Type of computing interaction analyzed | Thresholds |
| --- | --- | --- |
| "The most searched for" | driving directions | top 1 |
| "Amongst the most searched for" | driving directions | top 1% |
| "Often searched" | driving directions | top 10% |
| "Unique" | Any | N/A |
| "One of the best reviewed" | Online marketplace reviews | top 15% |
| "One of the most popular" | Total number of visits | top 10% |

Table 2, below, provides a non-limiting example of an "absolute" lookup table that may be used to select a template textual summary, including a type of computing interaction analyzed and example thresholds that may be used to select from a plurality of potentially applicable template textual summaries.

TABLE 2

| Summary type | Type of computing interaction analyzed | Thresholds |
| --- | --- | --- |
| "Popular with tourists" | home + driving directions | 60% of tourists |
| "Popular with locals" | home + driving directions | top 1% |
| "Popular at lunch/dinner/breakfast/late night" | Total number of visits + driving directions | top 10% |
| "Quick bites" | Visit duration | Average time spent <45 min |
| "Popular at brunch/happy hour" | Total number of visits + driving directions | top 10% |
| "Loyal customers" | Total number of visits + driving directions | top 10% |

Figure 4:
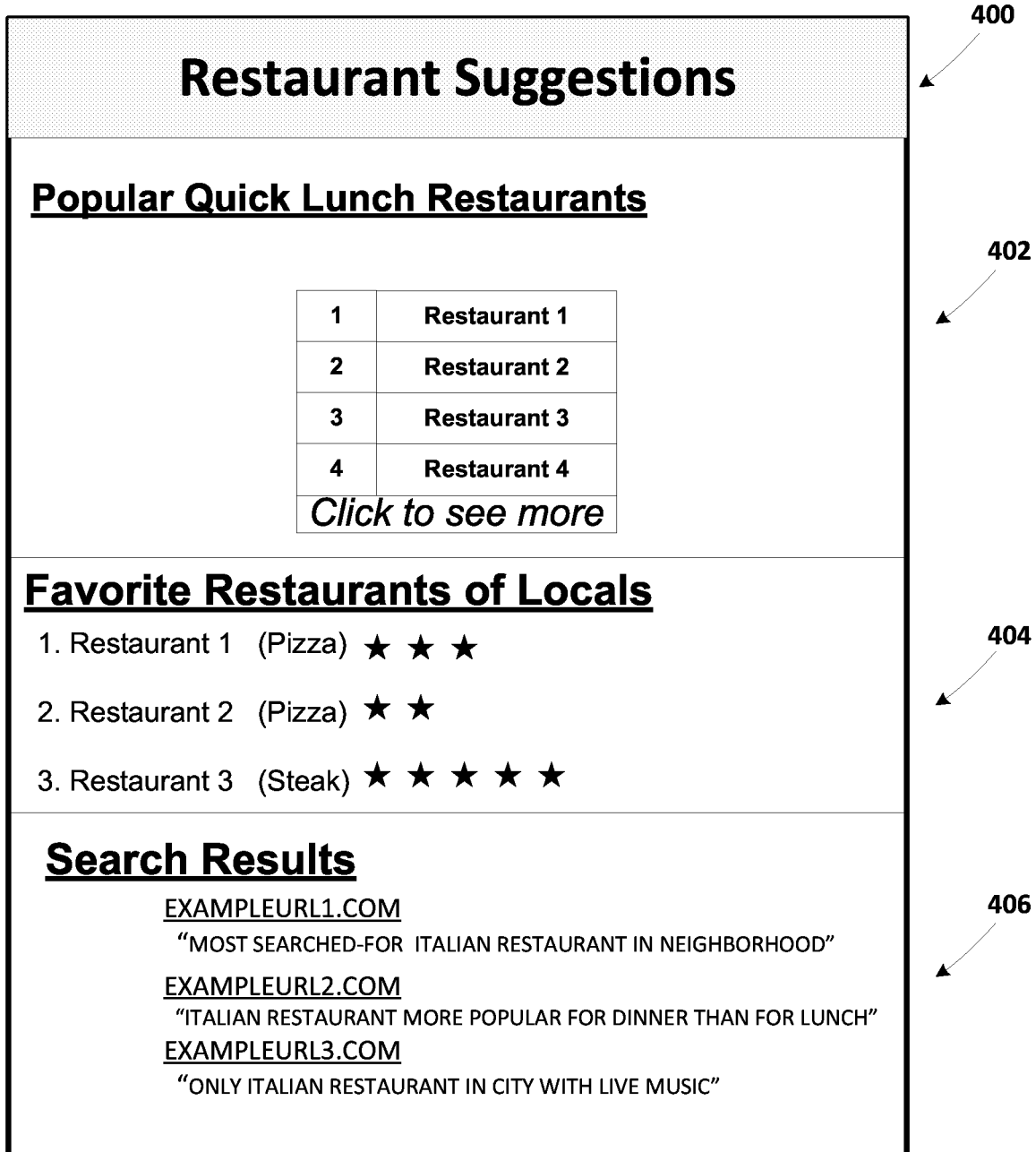
FIG. 4 illustrates an example interface that includes information provided based on aspects of locations and one or more generated textual summaries.

Referring to FIG. 4, an example interface 400 is provided that includes information based on determined aspects of locations. In some implementations, information system 140 may determine the information included in interface 400 of FIG. 4 and provide interface 400 (or information such as HTML or XML that facilitates rendering of interface 400) to client device 105 for presentation to a user. For example, information system 140 may be a search engine and interface 400 (or information to facilitate its rendering) may be provided to the user via browser 106 in response to the user providing a search query. Also, for example, information system 140 may be a suggestion system and interface 400 may be provided via a suggestion application of the client device 105. In some implementations, only parts of interface 400 of FIG. 4 may be provided to the user and/or the information may be provided via one or more alternate interfaces.

Lunch suggestions 402 may be provided to the user based on one or more aspects that are identified by information system 140 as related to the locations. For example, lunch suggestions 402 may be provided to the user in response to the user providing a query of "popular lunch restaurants", the user otherwise indicating an interest in lunch restaurants (e.g., selecting an interface element for "lunch restaurants"), or based on an identified context of the user (e.g., it is close to lunch time at the user's current location). In some implementations, lunch suggestions 402 may include locations that information system 140 has identified in POI database 154 as being associated with a "popular lunch location" aspect and the listing of locations may be provided based on the aspects. In some implementations, the ordering of the locations in the lunch suggestions 402 may be determined based on one or more aspects associated with the locations in POI database 154. For example, a location that is associated with an aspect of trending in popularity may be promoted in ranking in the list of provided locations.

Favorite restaurant suggestions 404 may be provided to a user via client device 105, either as a separate interface or as part of interface 400. In some implementations, favorite restaurant suggestions 404 may include one or more locations that are identified by information system 140 from POI database 154 and that are associated with a "favorite restaurants of locals" aspect. For example, grouping engine 122 may determine, for each of the restaurants of 404, a first group of computing interactions for the restaurant that are associated with "locals" (e.g., those who live near the restaurant) and a second group of computing interactions for the restaurant that includes "non-locals" (e.g., all interactions for the restaurant). Interaction measure engine 124 may determine first and second computing interaction measures based on the groups, and aspect engine 126 may determine, based on the measures, that the restaurant is popular with users that are locals. Information system 140 may provide the listed restaurants of 404 based on determining they are each associated with a "favorite restaurants of locals" aspects. Each of the restaurants also includes additional information, such as a popularity rating (indicated by stars) and a category of the restaurant (i.e., pizza and steak) that may be identified via information database 158 and/or POI database 154. In some implementations, one or more of the locations may be selected and/or ranked based on additional associated aspects (e.g., trending restaurants may be promoted, more popular restaurants may be promoted).

Search results 406 may be provided in interface 400 with other information as illustrated in FIG. 4 and/or may be provided as a separate interface. For example, information system 140 may be a search engine and search results 406 may be provided to the user via client device 105 in response to a query provided by the user. In some implementations, information that is provided with search results may be identified via information database 158 and the results may be selected and/or ranked based on aspects associated with locations that are related to the search results, as described herein.

In this example, search engine results 406 are accompanied by textual summaries generated by, for example, textual summary generation engine 128. For example, the first result is accompanied by the text, "Most searched-for Italian restaurant in neighborhood." This Italian restaurant evidently has been compared to a peer group of Italian restaurants in a particular neighborhood. The second result is accompanied by the text, "Italian restaurant more popular for dinner than for lunch." Computing interactions pertaining to this Italian restaurant have been compared across temporal periods (lunch and dinner time intervals). The third result is accompanied by the text, "Only Italian restaurant in city with live music." This Italian restaurant has been compared to a peer group of Italian restaurants in the "city," and apparently is unique among that peer group in having live music.

Figure 5:
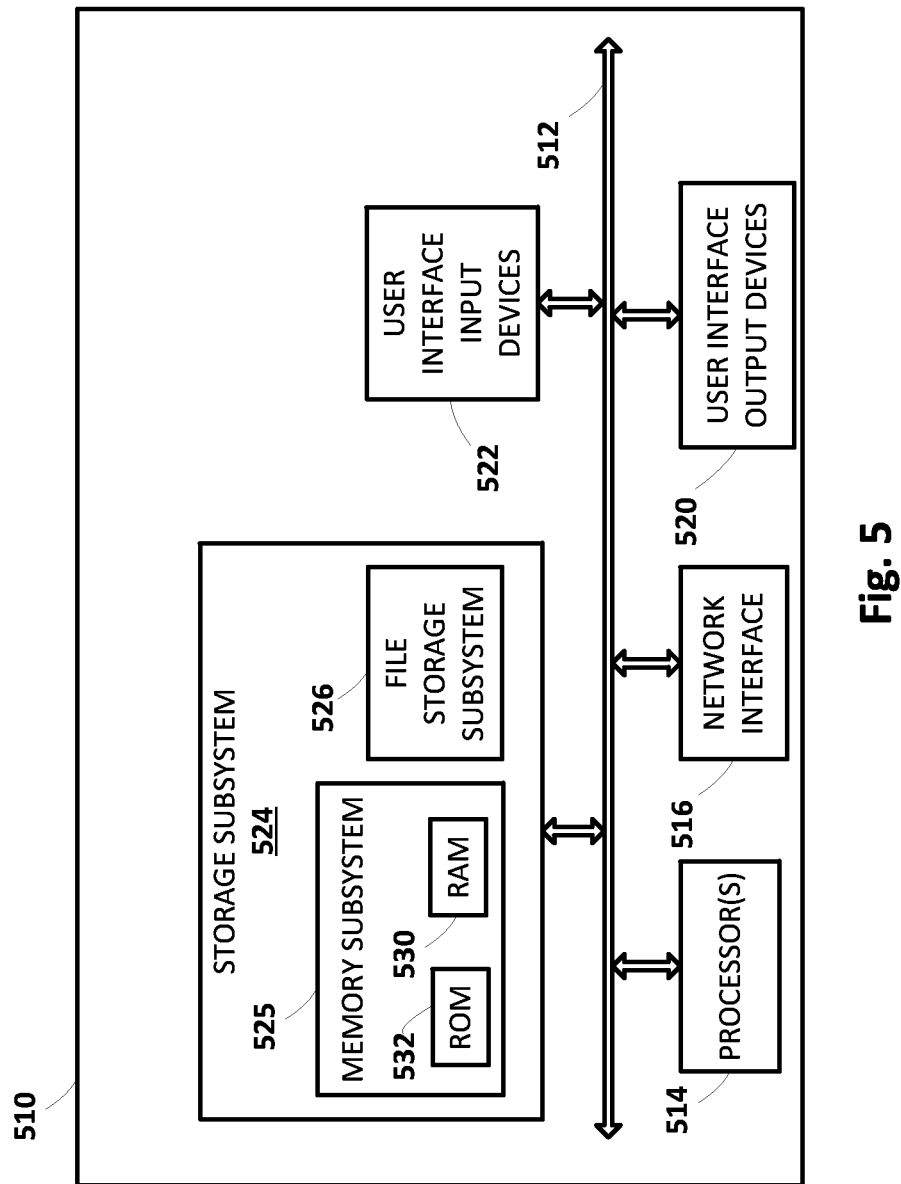
FIG. 5 illustrates an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of the method of FIG. 3, as well as one or more of the operations performed by grouping engine 122, interaction measure engine 124, aspect engine 126, textual summary generation engine 128, and so forth.

These software modules are generally executed by processor 514 alone or in combination with other processors. Memory 525 may include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
   receiving client device interactions that each indicate an interaction with a corresponding physical location and are each generated by a corresponding client device;
   determining a first group of the client device interactions based on the client device interactions of the first group each indicating interaction with a given physical location;
   determining a first interaction measure for the given physical location based on the first group of the client device interactions;
   determining a second interaction measure based on a second group of the client device interactions, wherein the second group of the client device interactions includes additional client device interactions that are in addition to the client device interactions of the first group, the additional client device interactions including additional physical location interactions that each indicate interaction with a respective additional physical location that is in addition to the given physical location;
   automatically generating a textual description of the given physical location based on comparison of the first interaction measure to the second interaction measure, wherein the textual description explicitly or implicitly conveys a relationship between the first interaction measure and the at least second interaction measure;

receiving, via one or more computer networks, from a user computing device, a subsequent search query;

identifying search results that are responsive to the subsequent search query, wherein the search results include at least one result pertaining to the given physical location; and providing, via the one or more computer networks, to the user computing device, information that causes the user computing device to render an interface that includes the textual description of the given physical location.

2. The method of claim 1, further comprising:

including the additional client device interactions in the second group based on similarity between the respective additional physical locations and the given physical location.

3. The method of claim 2, further comprising determining the similarity based on a category of the given physical location.

4. The method of claim 2, further comprising determining the similarity based on a geographic area of the given physical location.

5. The method of claim 1, wherein the first interaction measure is indicative of a measure of repeat interactions with the given physical location as indicated by the client device interactions of the first group and the second interaction measure is indicative of repeat interactions with the respective additional physical locations as indicated by the additional client device interactions of the second group.

6. The method of claim 1, wherein the first interaction measure is indicative of a first quantity of the client device interactions of the first group that are by users having a given user attribute and wherein the second interaction measure is indicative of a second quantity of the additional client device interactions of the second group that are by users having the given user attribute.

7. A computer implemented method, comprising:

receiving client device interactions that each indicate an interaction with a given physical location and are each generated by a corresponding client device;

determining a first group of the client device interactions based on the client device interactions of the first group each indicating interaction with the given physical location by users having a first user attribute;

determining a second group of the client device interactions based on the client device interactions of the second group each indicating interaction with the given physical location by users having a second user attribute that is incongruent with the first user attribute;

automatically generating a textual description of the given physical location based on comparison of a quantity of the client device interactions in the first group to a quantity of the client device interactions in the second group, wherein the textual description explicitly or implicitly conveys a relationship between the quantity of the client device interactions in the first group and the quantity of the client device interactions in the second group;

receiving, via one or more computer networks, from a user computing device, a subsequent request;

identifying results that are responsive to the subsequent request, wherein the results include at least one result pertaining to the given physical location; and providing, via the one or more computer networks, to the user computing device, information that causes the user computing device to render an interface that includes the textual description of the given physical location.

8. The method of claim 7, wherein the first user attribute is being local relative to the given physical location and the second user attribute is being non-local relative to the given physical location.

9. The method of claim 8, wherein the given physical location is a restaurant.

10. A system, comprising:

memory storing instructions; and one or more processors operable to execute the instructions in the memory, wherein the instructions comprise instructions to perform the following operations:

receiving client device interactions that each indicate an interaction with a corresponding physical location and are each generated by a corresponding client device;

determining a first group of the client device interactions based on the client device interactions of the first group each indicating interaction with a given physical location;

determining a first interaction measure for the given physical location based on the first group of the client device interactions;

determining a second interaction measure based on a second group of the client device interactions, wherein the second group of the client device interactions includes additional client device interactions that are in addition to the client device interactions of the first group, the additional client device interactions including additional physical location interactions that each indicate interaction with a respective additional physical location that is in addition to the given physical location;

automatically generating a textual description of the given physical location based on comparison of the first interaction measure to the second interaction measure, wherein the textual description explicitly or implicitly conveys a relationship between the first interaction measure and the at least second interaction measure;

receiving, via one or more computer networks, from a user computing device, a subsequent search query;

identifying search results that are responsive to the subsequent search query, wherein the search results include at least one result pertaining to the given physical location; and providing, via the one or more computer networks, to the user computing device, information that causes the user computing device to render an interface that includes the textual description of the given physical location.

11. The system of claim 10, further comprising instructions for:

including the additional client device interactions in the second group based on similarity between the respective additional physical locations and the given physical location.

12. The system of claim 11, further comprising instructions for determining the similarity based on a category of the given physical location.

13. The system of claim 11, further comprising instructions for determining the similarity based on a geographic area of the given physical location.

14. The system of claim 10, wherein the first interaction measure is indicative of a measure of repeat interactions with the given physical location as indicated by the client device interactions of the first group and the second interaction measure is indicative of repeat interactions with the respective additional physical locations as indicated by the additional client device interactions of the second group.

15. The system of claim 10, wherein the first interaction measure is indicative of a first quantity of the client device interactions of the first group that are by users having a given user attribute and wherein the second interaction measure is indicative of a second quantity of the additional client device interactions of the second group that are by users having the given user attribute.

16. At least one non-transitory computer-readable medium comprising instructions that, in response to execution of the instructions by one or more processors, cause the one or more processors to perform the following operations:

receiving client device interactions that each indicate an interaction with a corresponding physical location and are each generated by a corresponding client device;

determining a first group of the client device interactions based on the client device interactions of the first group each indicating interaction with a given physical location;

determining a first interaction measure for the given physical location based on the first group of the client device interactions;

determining a second interaction measure based on a second group of the client device interactions, wherein the second group of the client device interactions includes additional client device interactions that are in addition to the client device interactions of the first group, the additional client device interactions including additional physical location interactions that each indicate interaction with a respective additional physical location that is in addition to the given physical location;

automatically generating a textual description of the given physical location based on comparison of the first interaction measure to the second interaction measure, wherein the textual description explicitly or implicitly conveys a relationship between the first interaction measure and the at least second interaction measure;

receiving, via one or more computer networks, from a user computing device, a subsequent search query;

identifying search results that are responsive to the subsequent search query, wherein the search results include at least one result pertaining to the given physical location; and providing, via the one or more computer networks, to the user computing device, information that causes the user computing device to render an interface that includes the textual description of the given physical location.

17. The at least one non-transitory computer-readable medium of claim 16, further comprising instructions for:

including the additional client device interactions in the second group based on similarity between the respective additional physical locations and the given physical location.

18. The at least one non-transitory computer-readable medium of claim 17, further comprising instructions for determining the similarity based on a category of the given physical location.

19. The at least one non-transitory computer-readable medium of claim 17, further comprising instructions for determining the similarity based on a geographic area of the given physical location.

20. The at least one non-transitory computer-readable medium of claim 16, wherein the first interaction measure is indicative of a measure of repeat interactions with the given physical location as indicated by the client device interactions of the first group and the second interaction measure is indicative of repeat interactions with the respective additional physical locations as indicated by the additional client device interactions of the second group.

\* \* \* \* \*